United States Patent [19]

Mefferd

[11] Patent Number: 5,269,572

[45] Date of Patent: Dec. 14, 1993

[54] APPARATUS AND METHOD FOR COUPLING ELONGATED MEMBERS

[75] Inventor: Floyd R. Mefferd, Laurens, Iowa

[73] Assignee: Gold Star Manufacturing, Inc., Laurens, Iowa

[21] Appl. No.: 937,979

[22] Filed: Aug. 28, 1992

[51] Int. Cl.⁵ .................. F16L 25/06; E21B 17/22
[52] U.S. Cl. ...................... 285/330; 285/331; 285/398; 285/419; 29/525.1; 29/469; 403/339; 403/341
[58] Field of Search ............... 285/330, 331, 371, 398, 285/419; 29/525.1, 469; 403/339, 341, 340

[56] References Cited

U.S. PATENT DOCUMENTS

| 1,054,812 | 3/1913 | Zierath | 285/330 |
| 2,195,492 | 4/1940 | McDonald | 285/330 |
| 3,190,377 | 6/1965 | Rassieur | 175/323 |
| 3,206,936 | 9/1965 | Moor | 285/913 |
| 3,240,513 | 3/1966 | Turzillo | 175/323 |
| 3,794,127 | 2/1974 | Davis | 175/323 |
| 3,796,448 | 3/1974 | Ringkamp | 285/330 |
| 3,967,837 | 7/1976 | Westerlund et al. | 285/365 |
| 4,354,698 | 10/1982 | Linder et al. | 285/371 |
| 4,615,543 | 10/1986 | Cannon | 285/419 |
| 4,821,818 | 4/1989 | Mefferd | 175/323 |

FOREIGN PATENT DOCUMENTS 45724  2/1982  European Pat. Off. ............ 285/330

Primary Examiner—Mark Rosenbaum
Assistant Examiner—Jeffrey T. Knapp
Attorney, Agent, or Firm—Jenner & Block

[57] ABSTRACT

A pair of elongated cylindrical members are constructed with first and second collars extending axially beyond their adjoining ends. The first and second collars have adjoining indentations and projections at their end edges which are adapted to interlock with one another so as to prevent rotation of the two elongated members with respect to one another. A coupler is removably fitted over the exterior of the first and second collars and holds them together against axial movement with respect to one another. The collars are each welded to the axial ends of the first and second cylindrical members.

10 Claims, 2 Drawing Sheets

APPARATUS AND METHOD FOR COUPLING ELONGATED MEMBERS

BACKGROUND OF THE INVENTION

This invention relates to apparatus and method for coupling elongated members together in end to end relationship. The invention may be used for coupling together elongated hollow tubes, elongated solid shafts, or elongated members having flighting or other structure on the outer surface thereof.

There are many instances where the coupling of elongated members together in end to end relationship is desirable. For example, in the drilling of wells, it is desirable to connect a plurality of auger sections in end to end relationship as the well is being drilled. At times it may be desirable to couple elongated solid shafts together in end to end relationship, or elongated hollow tubes in end to end relationship.

In all of these applications, it is desirable that the various sections of elongated members be rigidly coupled together and maintained in longitudinal alignment with one another. It is also desirable to couple these sections together so that they can be rotated in unison when torque is applied to them.

U.S. Pat. No. 4,821,818 discloses a coupling system for separate tube auger sections. The adjoining ends of the auger sections each include a collar which surrounds the end of the tube. The collar on one of the tubes is positioned rearwardly from the end of the tube so that the end of the tube protrudes beyond the collar. The collar on the other tube protrudes axially beyond the end of the tube. The axial ends of the two collars include projections and indentations which are adapted to mate together so as to hold the tubes against rotation with respect to one another. A hinged coupler is foldable to surround the two collars and hold them together so that the tube sections are held against axial movement away from one another.

Both of the collars in U.S. Pat. No. 4,821,818 are attached to the tube sections by slipping them over the ends of the tube sections and welding them in place. This weld joint is difficult and time consuming to do.

Therefore, a primary object of the present invention is the provision of an improved apparatus and method for coupling elongated members together in end to end relationship.

A further object of the present invention is the provision of apparatus and method which can be assembled in less time and with greater ease than the assembly shown in U.S. Pat. No. 4,821,818.

A further object of the present invention is the provision of an apparatus and method which can be used to couple various types of elongated members together, including solid shafts, hollow tubes, and elongated members having flightings or other structure on the exterior surface thereof.

SUMMARY OF THE INVENTION

The foregoing objects are achieved by apparatus which include first and second collars attached to the adjoining axial ends of first and second elongated cylindrical members. The elongated cylindrical members may be hollow tubes, solid shafts, or elongated members having flighting or other structure on the exterior thereof. The first and second collars each include annular collar shoulders facing axially away from one another. The first and second collars also include adjoining end edges, each of which include axially extending protrusions and indentations. The protrusions and indentations are adapted to mate with one another when the first and second collars are joined together so as to cause the two collars to rotate in unison with one another. Both of the collars are welded to, and extends axially beyond, the axial end of the shaft or tube to which they are connected. The weld joints connecting the collars to the ends of the tubes are easier and quicker to make than the weld joints shown between the collars and the tubes of U.S. Pat. No. 4,821,818.

An elongated cylindrical connecting tube is press fitted within an internal bore of one of the two collars. This connecting tube projects beyond the axial end of the collar to which it is press fitted, and the projecting portion of the connecting tube is matingly fitted within an internal bore of the other collar.

A hinged coupler is foldable around the two interlocked collars. The coupler includes a pair of spaced apart annular flanges which engage the coupler shoulders of the first and second couplers so as to hold the first and second couplers together in their interlocked relationship and prevent them from moving axially away from one another. The coupler is comprised of two separate semi-cylindrical halves which are hinged together so that they can be folded around the exterior interlocked collars.

DESCRIPTION OF THE PREFERRED EMBODIMENT

Figure 1:
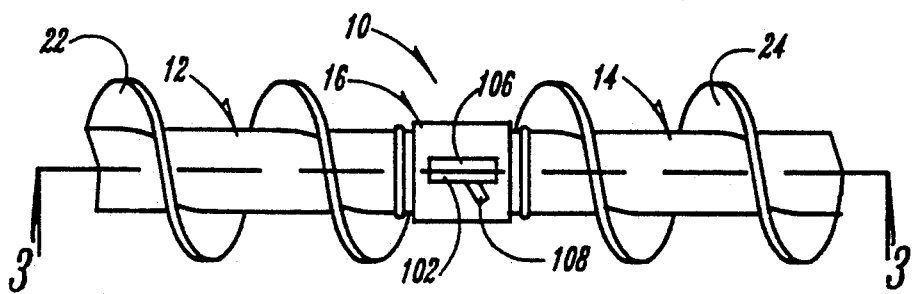
FIG. 1 is an elevational view of a pair of auger sections joined together by the present invention.

Referring to the drawings, the numeral 10 generally designates a tube assembly formed from a first elongated tube 12 and a second elongated tube 14. Tubes 12, 14 are joined together by a coupler 16. Tubes 12, 14 include tube bores 18, 20 respectively, and include flightings 22, 24 on their respective outer surfaces. While tubes 12, 14 are shown to be hollow, they can also be solid shafts, and they can be provided either with or without the flightings 22, 24 on their exterior surfaces. Tube 12 includes a chamfered tube end 26 and tube 14 includes a chamfered tube end 28. Attached to the axial end of tube 12 is a male collar 30, and attached to the axial end of tube 14 is a female collar 32. Collars 30, 32 each include a first bore 34 and a second larger bore 36. The diameter of the second larger bore 36 in female collar 32 is preferably slightly larger than the diameter of second bore 36 in male collar 30. The inner end of bore 36 in collar 32 is provided with an O-ring groove 38 having an elastomeric O-ring 40 seated therein. Collar 30 does not have an O-ring groove.

Figure 3:
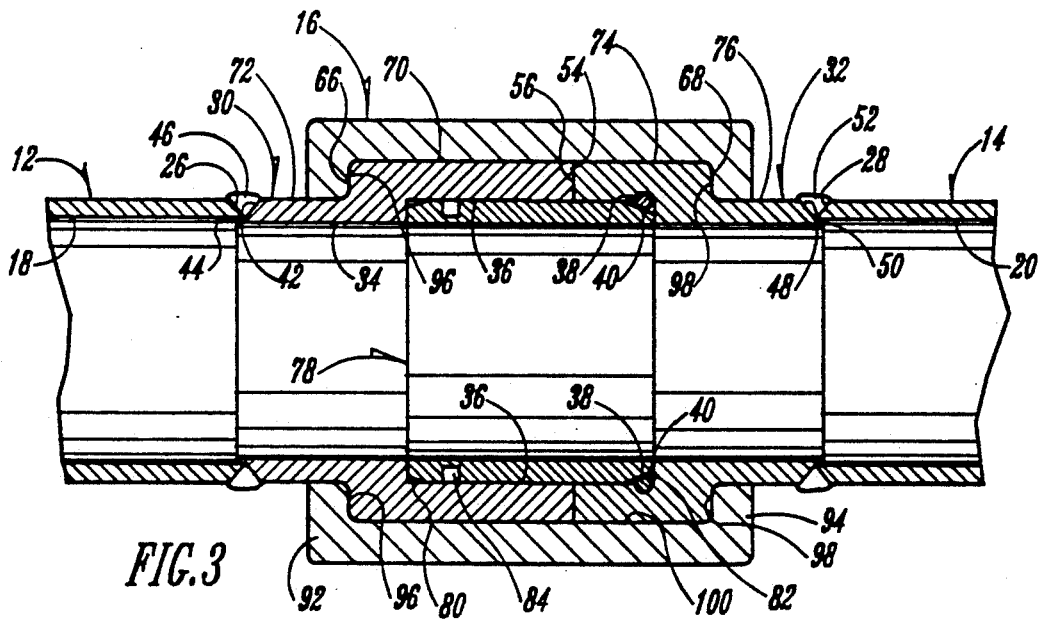
FIG. 3 is a sectional view taken along line 3—3 of FIG. 1.

The end of collar 30 which is attached to the tube 18 includes a chamfered shoulder 42 which terminates in an annular lip flange 44. Lip flange 44 is adapted to fit within the tube bore 18 of tube 12 as shown in FIG. 3. The collar 30 and the tube 12 are then joined together by an annular weld 46. Weld 46 is much easier and less time consuming to make than the weld seam shown in U.S. Pat. No. 4,821,818. It has been found that the collars 30, 32 of the present invention can be constructed and attached to tubes 12, 14 in approximately four less hours than is required for constructing and attaching the collars in the construction shown in U.S. Pat. No. 4,821,818.

Collar 32 includes a chamfered shoulder 48 and an annular lip flange 50 which fits within the tube bore 20 of tube 14. An annular weld 52 attaches collar 32 to tube 14 in a manner similar to the way weld 46 attaches collar 30 to tube 18.

Collars 30, 32 each include facing end edges 54, 56 respectively. End edge 54 includes a plurality of projections 58 which alternate with indentations 60. End edge 56 includes a plurality of projections 62 and indentations 64 which are adapted to matingly fit within the projections 58, 60 of collar 30.

The exterior surfaces of collars 30, 32 are each provided with axially facing collar shoulders 66, 68 which face in opposite directions from one another. On opposite sides of shoulder 66, collar 30 is provided with an enlarged diameter portion 70 and a reduced diameter portion 72. Collar 32 is provided with an enlarged diameter portion 74 and a reduced diameter portion 76 which are positioned on opposite sides of shoulder 68.

A connecting tube 78 is press fitted within the collar bore 36 of first collar 30 and includes opposite chamfered ends 80, 82. An annular groove 84 having an elastomeric O-ring (not shown) seated therein is positioned adjacent chamfered end 80. When tube 78 is press fitted within collar bore 36 of collar 30, it protrudes axially beyond the end of collar 30 and is sized to matingly fit within the second collar bore 36 of collar 32 as is shown in FIG. 3.

Because the diameter of bore 36 in female collar 32 is slightly larger than the diameter of bore 36 in male collar 30, connecting tube 78 can be press fitted very snuggly within collar bore 36 of collar 30, but fits somewhat more loosely within collar bore 36 of collar 32. This allows sections of tubes to be easily assembled and disassembled because connecting tube 78 will remain fitted within the smaller collar bore during the assembly or disassembly process.

Coupler 16 surrounds the interlocked collars 30, 32 and includes a first coupler half 86 and a second coupler half 88. Coupler halves 86, 88 are pivotally joined by an axial hinge 90. Coupler 16 includes an internal end flange 92 at one end thereof, and an internal end flange 94 at the other end thereof. Flanges 92, 94 each provide spaced apart facing shoulders 96, 98 which define an enlarged bore 100 therebetween.

Figure 2:
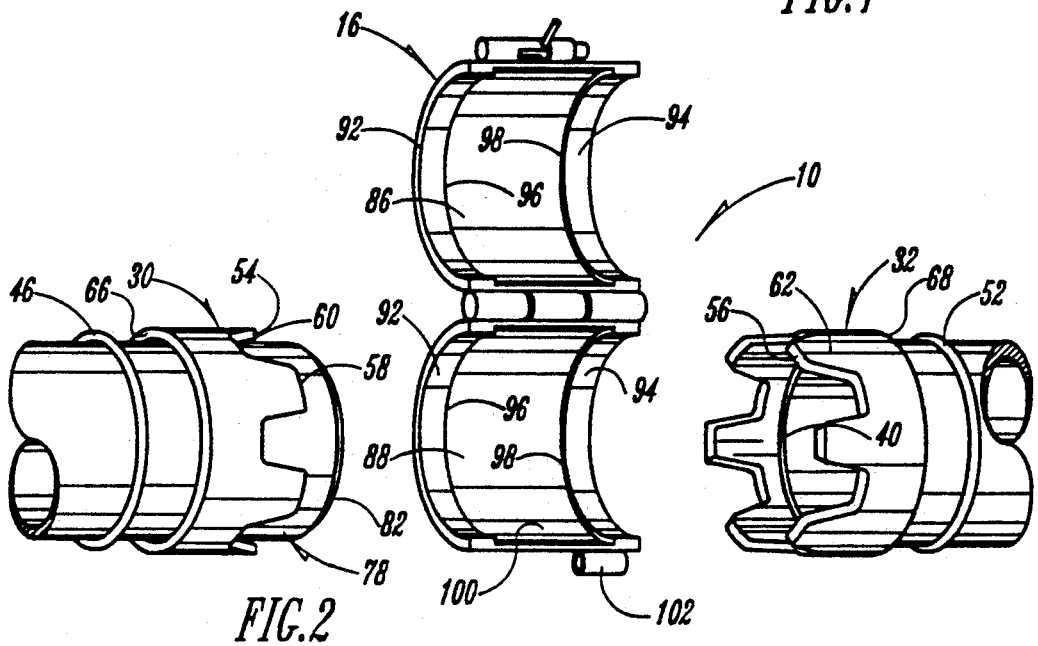
FIG. 2 is a pictorial exploded view of the two ends of the tubes to be joined and the hinged coupler for locking them together.

The coupler halves 86, 88 may be attached together in the manner shown in FIGS. 1 and 2 by means of an interlocking locking sleeve 102 and locking pin 104. Locking pin 104 is telescopically received within a pin cylinder 106 and includes a pin handle 108 which projects outwardly through a pin groove 110 in pin cylinder 106. The pin 104 is spring mounted so as to be biased to its extended position shown in FIG. 6. Handle 108 may be used to retract pin 104 so that it can be aligned with sleeve 102 and permitted to spring to its extended position within the sleeve 102, thereby locking the coupler halves into a complete cylinder.

When the coupler 16 is folded into surrounding engagement over the interlocking collars 30, 32, the shoulders 96, 98 of coupler 16 face and engage the shoulders 66, 68 of sleeves 30, 32. This holds the sleeves 30, 32 against axial movement away from one another. An important feature of the present invention is that when coupler 16 is fitted in surrounding engagement over collars 30, 32, any axial tension between tubes 12, 14 is borne by the adjoining shoulders 66, 96 and 68, 98. The pin 104 and the sleeve 102 do not carry any axial tension forces between tubes 12 and 14.

Any tendency of tubes 12, 14 to rotate with respect to one another is prevented by the interlocking indentations and projections 60, 58, 62, 64 of collars 30, 32. Thus the securement of tubes 12 and 14 together is rigid, and the tubes 12, 14 are able to rotate in unison with one another as though they were one.

Figure 4:
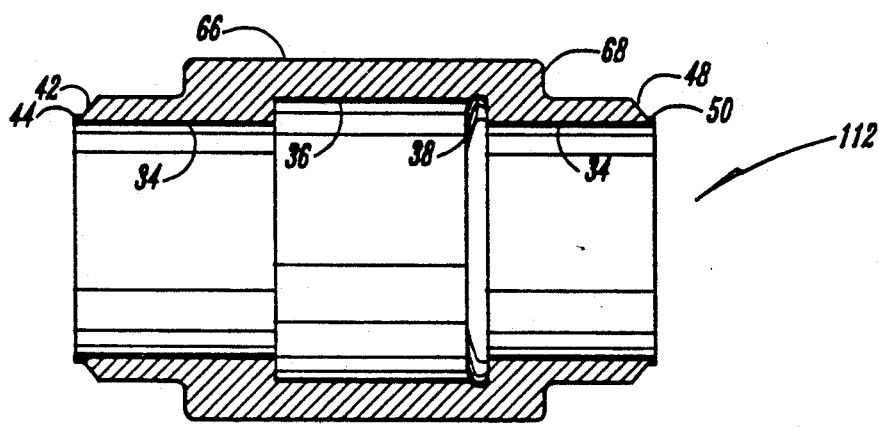
FIG. 4 is a sectional view of an elongated cylinder before it is cut in half to form the two collars used with the present invention.
Figure 5:
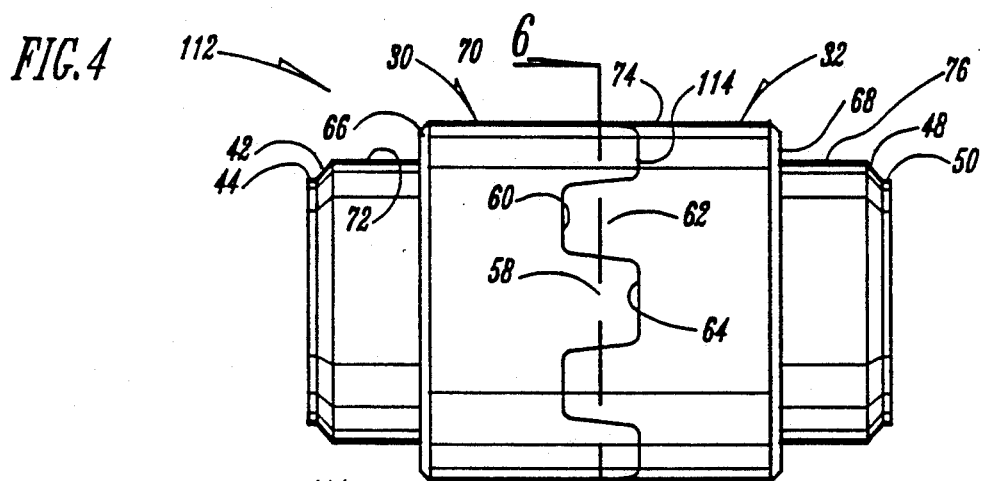
FIG. 5 is an elevational view of the elongated cylinder in FIG. 4 showing the cut line for separating the two collars from one another.
Figure 6:
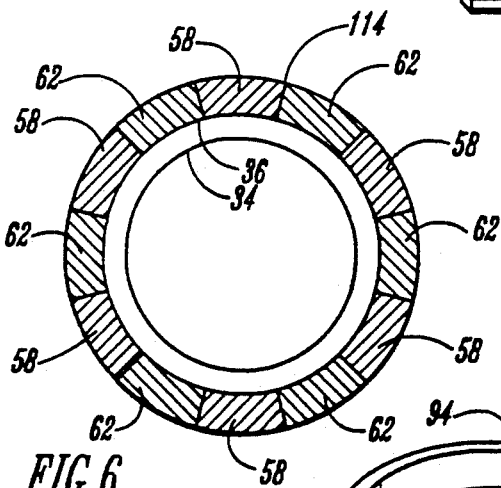
FIG. 6 is a sectional view taken along line 6—6 of FIG. 5.
Figure 7:
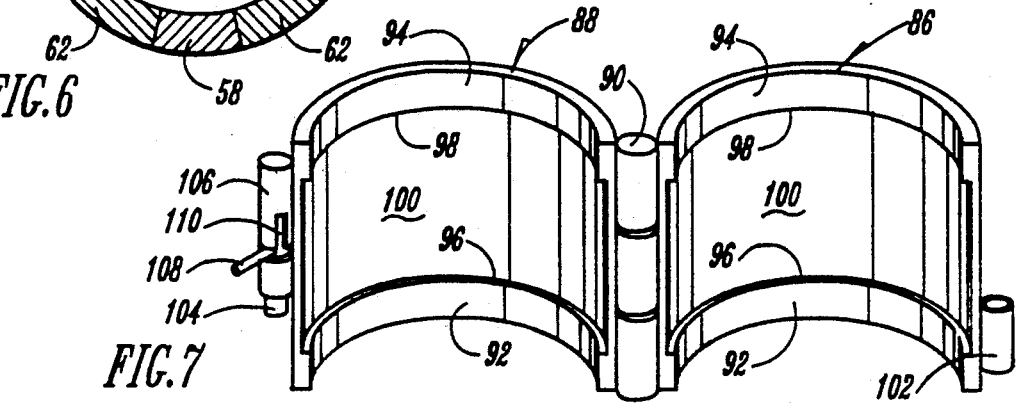
FIG. 7 is a perspective view of the hinged coupler used with the present invention.

Referring to FIGS. 4, 5, and 6, the collars 30, 32 of the present invention are constructed in a unique manner. FIG. 4 illustrates a unitary cylindrical tube 112 which is used to construct collars 30, 32. Tube 112 is machined out to provide the first and second collar bores 34, 36 for collars 30, 32 respectively. The O-ring groove 38 is also machined out from the interior of unitary tube 112. Similarly the chamfereds 42, 48 and the lip flanges 44, 50, as well as the shoulders 66, 68 are machined on the exterior surface of the tube 112.

Referring to FIG. 5, the tube 112 is then cut into two separate collars 30, 32 along a cut line designated by the numeral 114 in FIG. 5. Cut line 114 is preferably formed by a laser cutting tool so as to provide a clean cut. Cutting line 114 follows the pattern which establishes the indentations 60, 64, and the projections 58, 62. Also, as can be seen in FIG. 6, the cut line 114 is made in radial direction so that the edges of projections 58, 62 and indentations 60, 64 extend along a radius of cylinder 112. By forming the collars 30, 32 in this manner, it is possible to ensure that the projections 58, 62 matingly fit within the indentations 60, 64 so as to provide a tight secure mating fit.

After the collars 30, 32 have been formed, they are welded to the ends of tubes 12, 14 by annular welds 46, 52, and the construction of the tube sections is complete. It has been found that the construction of tube sections in this manner saves approximately four hours over the construction time required for the tube sections shown in U.S. Pat. No. 4,821,818.

The preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

I claim:

1. In combination:

first and second elongated cylindrical members, said first member having a male end and said second member having a female end, and being arranged in end-to-end relationship with said male end of said first cylindrical member adjacent said female end of said second cylindrical member;

a first collar attached to and extending axially beyond said male end of said first cylindrical member, said first collar having a collar shoulder facing axially toward said first cylindrical member and having an end edge presented away from said first cylindrical member, said end edge including at least one axially extending projection and at least one axial indentation therein;

a second collar attached to and extending axially beyond said female end of said second cylindrical member, said second collar having a collar shoulder facing axially toward said second cylindrical member and having an end edge presented axially away from said second cylindrical member, said end edge of said second collar having at least one axial projection and at least one axial indentation matingly interlocked with said indentation and projection of said first collar so as to hold said first cylindrical member and said second cylindrical member against rotation about their respective longitudinal axes with respect to one another;

said first collar having an internal bore therein opening toward said second collar of said second cylindrical member;

said second collar having an internal bore therein opening toward said first collar;

a third cylindrical member matingly fitted within both of said internal bores of said first and second collars; and a detachable coupling member surrounding said interlocked first and second collars and having a first coupling shoulder engaging said collar shoulder of said second collar for limiting axial movement of said interlocked first and second collars away from one another.

2. A combination according to claim 1 wherein said first and second collars each include a cylindrically shaped connecting portion registered with and engaging said male and female ends respectively of said first and second cylindrical members, a first weld joint fixedly attaching said connecting portion of said first collar to said male end of said first cylindrical member, a second weld joint fixedly attaching said connecting portion of said second collar to said female end of said second cylindrical member.

3. A combination according to claim 2 wherein said first and second collars are axially positioned substantially completely between said first and second weld joints.

4. A combination according to claim 1 wherein said third cylindrical member is fixedly attached within one of said internal bores of said first and second collars.

5. A combination according to claim 4 wherein said third cylindrical member is press fitted within said one internal bore.

6. A method for making first and second elongated members capable of being detachably joined together in end-to-end relation with one another, said method comprising:

attaching a first collar to a first end of said first elongated member so that said first collar extends axially beyond said first end of said first elongated member, said first collar having a collar shoulder facing toward said first end of said first elongated member and having an end edge presented axially away from said first end of said first elongated member, said end edge having at least one axially extending projection and at least one axial indentation therein, said first collar having an internal bore opening axially away from said first end of said first elongated member;

attaching a second collar to a second end of said second elongated member so that said second collar extends axially beyond said second end of said second elongated member, said second collar having a collar shoulder facing toward said second end of said second elongated member, an internal bore opening axially away from said second end of said second elongated member, and an end edge presented axially away from said second end of said second elongated member, said end edge of said second collar having at least one axial projection and at least one axial indentation sized and shaped to matingly interlock with said indentation and said projection of said first collar;

inserting a first portion of a third elongated member into said internal bore of one of said first and second collars so that a second portion of said third elongated member protrudes axially beyond said internal bore of said one collar;

inserting said second portion of said third elongated member within said internal bore of said other one of said first and second collars so as to join said first and second collars together with said axial indentations and projections matingly fitted together; and surrounding said first and second collars with a coupling member having first and second spaced apart coupling shoulders embracing said collar shoulders of said first and second collars therebetween for holding said first and second collars against axial movement away from one another.

7. A method according to claim 6 wherein said attachment of said first and second collars to said first and second elongated members is accomplished by welding.

8. A method according to claim 6 and further comprising fixedly attaching said first portion of said third elongated member to said one collar when said first portion is inserted into said internal bore of said one collar.

9. A method according to claim 6 wherein said attachment of said first portion of said third elongated member to said one collar is accomplished by press fitting said first portion within said internal bore of said one collar.

10. A method according to claim 6 wherein said first and second collars are formed by cutting a single cylinder having a cylinder bore extending therethrough into two separate pieces along a cutting line extending circumferentially around said single cylinder intermediate the opposite axial ends thereof, said cutting line forming said indentations and projections of said first and second collars and said two separate pieces forming said first and second collars.

* * * * *